UNITED STATES PATENT OFFICE.

ALOIS SCHAIDHAUF, OF FRANKFORT-ON-THE-MAIN, GERMANY, ASSIGNOR TO ROESS-
LER & HASSLACHER CHEMICAL COMPANY, OF NEW YORK, N. Y., A CORPORATION
OF NEW YORK.

PROCESS FOR RENDERING ALKALI PERCARBONATES STABLE.

1,225,872. Specification of Letters Patent. Patented May 15, 1917.

No Drawing. Application filed January 16, 1917. Serial No. 142,719.

*To all whom it may concern:*

Be it known that I, ALOIS SCHAIDHAUF, a subject of the German Emperor, and resident of Frankfort-on-the-Main, Germany, have invented certain new and useful Improvements in Processes for Rendering Alkali Percarbonates Stable, of which the following is a specification.

My invention relates to the manufacture of alkali percarbonates, and particularly to the manufacture of sodium percarbonates; its object being to provide improvements whereby the stability of the resulting product of the manufacture is increased.

Alkali percarbonates as produced hitherto in accordance with known processes have had a considerable instability, both, in the solid condition as well as in the form of solutions, this being the reason why the percarbonates could not be applied for technical purposes before this time. I have made experiments to produce stable percarbonates but these experiments, at first, had no good results. I employed substances which were pure technically as well as chemically. I took care to prevent foreign substances, which possibly could cause a decomposition of the percarbonate, from coming in action with the mixture of reaction or with the finished salt. In spite of these precautionary measures, I could not obtain percarbonates that could be considered stable. So, I had to conclude that either the percarbonates are selfdecomposing or that the decomposition is started by foreign constituents of so small proportions that their presence could not possibly be proved analytically.

Now, I have made the surprising discovery that the stability of the solid percarbonates may be favorably influenced to a considerable extent by stabilizing agents. I have further ascertained that the beneficial effect of stabilizing agents extends also to solid mixtures of percarbonates with other substances, for instance, such mixtures as are usually used as washing and bleaching mediums, and also to solutions containing active oxygen in form of percarbonates. By the knowledge thus obtained it was possible to produce valuable washing and bleaching mediums containing a carbonate as the oxygen carrier.

Generally, an addition of small quantities of the stabilizing agents suffices to produce the desired durability and stability of the percarbonates.

The protective substances acting as stabilizing agents may be incorporated during the manufacture of the percarbonates, or the same may be added to the finished salts. Moreover, both of these modes of application may be combined by adding stabilizing agents to the percarbonate during the process of manufacture of the same and also after their completion.

In certain cases it may be advisable to apply several stabilizing agents of different character, as, for instance, inorganic and organic stabilizing agents. Stabilizing substances of an inorganic character may be incorporated during the process of manufacture, while organic protective substances may be added after the completion of the salts.

I have found that as such protective substances the silicates, such as magnesium-silicate, alkali-silicate, magnesium-alkali-silicate, are useful. Other salts, likewise, have proved to be capable of acting as stabilizing agents, especially so the salts of magnesium, for instance, chlorid of magnesium. Of protective substances of an organic character, I may refer to gum-arabic. The protective substances may be added as such, or the same may be produced in the presence of the percarbonate, or in the presence of the mixture from which the percarbonate is generated.

I may, for instance, proceed in such a way that I add to a solution of sodium peroxid a small proportion of magnesium silicate, or alkali-silicate, or magnesium-alkalisilicate, or a salt of magnesium plus alkali-silicate, as for instance a mixture of magnesium chlorid and sodium silicate yielding magnesium-silicate under conditions allowing double decomposition, and effect an association of the carbonic acid with the sodium peroxid in well known manner under the influence of a cooling action. The same procedure may be followed in connection with other processes of manufacturing alkali percarbonate, for instance, when the alkali percarbonate is being produced from alkali-carbonate and hydrogen peroxid.

The substances acting as stabilizing agents display a selective property in regard to the manner of exerting "protection"; some of them improve the stability of the solid salt, whereas others preferably render the solutions of the percarbonates more stable. To secure both effects simultaneously it is advisable, in suitable cases, to apply different protective substances. So, for instance, may magnesium-chlorid be incorporated with the mixture of reaction, while gum-arabic may be added to the finished salt.

Since it has been discovered that the stability of the percarbonates may be influenced in a prominent manner, it remains to be ascertained by tests, in each case, which protective agents, or which combination of protective agents, will produce the best effect.

Sometimes, in the scientific literature, true percarbonates are distinguished from hydrogen-peroxid-association-products. As may be inferred from the examples referred to hereinbefore, my present invention extends to peroxid carbonates in a general sense, no matter by what process the same are produced and what their consitution is like.

What I claim as my invention and desire to secure by Letters Patent of the United States, is:—

1. The method of rendering alkali-percarbonates stable, consisting in incorporating stabilizing agents with the alkali percarbonates during the process of manufacturing said alkali percarbonates.

2. A process of imparting storage stability to alkali percarbonates, consisting in incorporating stabilizing agents with the alkali percarbonates during the process of manufacturing said alkali percarbonates, and adding further stabilizing agents to the finished salt.

3. A process of imparting storage stability to alkali percarbonates, consisting in incorporating with the alkali percarbonates stabilizing agents capable of rendering solid percarbonates stable, and adding further stabilizing agents capable of rendering solutions of percarbonates stable.

4. A process of imparting storage stability to alkali percarbonates, consisting in incorporating with the alkali percarbonate stabilizing agents containing silicic acid combined as a silicate.

5. A process of imparting storage stability to alkali percarbonates, consisting in incorporating with the alkali percarbonate stabilizing agents containing silicic acid combined as a silicate and magnesium.

6. A process of imparting storage stability to alkali percarbonates, consisting in incorporating with the alkali percarbonate stabilizing agents containing silicic acid combined as a silicate and alkali.

7. A process of imparting storage stability to alkali percarbonates, consisting in incorporating with the alkali percarbonate stabilizing agents containing silicic acid, combined as a silicate, magnesium, and alkali.

8. A process of imparting storage stability to alkali percarbonates, consisting in adding to the alkali percarbonate magnesium-silicate.

9. A process of imparting storage stability to alkali percarbonates, consisting in incorporating with the alkali percarbonates stabilizing agents containing silicic acid combined as a silicate and a compound free from combined silicic acid and capable of exerting a stabilizing effect.

10. A process of imparting storage stability to alkali percarbonates, consisting in incorporating with the alkali percarbonates stabilizing agents containing silicic acid combined as a silicate and a magnesium salt free from combined silicic acid.

11. A process of imparting storage stability to alkali percarbonates, consisting in incorporating with the alkali percarbonates stabilizing agents containing silicic acid combined as a silicate and chlorid of magnesium.

12. A process of imparting storage stability to alkali percarbonates, consisting in adding to the alkali percarbonates stabilizing agents containing silicic acid combined as a silicate and gum-arabic.

13. An alkali-percarbonate, containing silicic acid combined as a silicate as a stabilizing agent.

14. An alkali percarbonate, containing silicic acid combined as a silicate and magnesium as stabilizing agents.

15. An alkali percarbonate, containing silicic acid combined as a silicate and alkali as stabilizing agents.

16. An alkali percarbonate, containing silicic acid combined as a silicate, magnesium and alkali as stabilizing agents.

17. An alkali percarbonate, containing magnesium-silicate as a stabilizing agent.

18. An alkali percarbonate, containing silicic acid combined as a silicate and furthermore chlorid of magnesium as stabilizing agents.

19. An alkali percarbonate, containing as stabilizing agents a small proportion of silicic acid combined as a silicate and gum-arabic.

In testimony whereof I have signed my name to this specification in the presence of two subscribing witnesses.

ALOIS SCHAIDHAUF.

Witnesses:
VALENLIN WEICKEL,
JEAN GRUND.